(12) United States Patent
O'Brien et al.

(10) Patent No.: US 8,358,031 B2
(45) Date of Patent: Jan. 22, 2013

(54) SYSTEM AND METHOD FOR A SINGLE STAGE POWER CONVERSION SYSTEM

(75) Inventors: Kathleen Ann O'Brien, Niskayuna, NY (US); Ralph Teichmann, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 249 days.

(21) Appl. No.: 12/714,029

(22) Filed: Feb. 26, 2010

(65) Prior Publication Data

US 2011/0210608 A1 Sep. 1, 2011

(51) Int. Cl.
*H02J 1/00* (2006.01)
(52) U.S. Cl. .......................................... 307/69
(58) Field of Classification Search .................. 307/326, 307/64, 69
See application file for complete search history.

(56) References Cited

U.S. PATENT DOCUMENTS

| | | | |
|---|---|---|---|
| 6,239,997 B1 * | 5/2001 | Deng | 363/95 |
| 7,256,566 B2 | 8/2007 | Bhavaraju et al. | |
| 7,449,668 B2 | 11/2008 | Schutten et al. | |
| 2007/0084498 A1 | 4/2007 | Taylor et al. | |
| 2010/0014335 A1 | 1/2010 | Iwata et al. | |
| 2010/0231045 A1 * | 9/2010 | Collins et al. | 307/47 |

FOREIGN PATENT DOCUMENTS

| | | |
|---|---|---|
| JP | 64001479 A | 1/1989 |
| WO | WO2008139267 * | 11/2008 |

OTHER PUBLICATIONS

Merriam-Websters Dictionary, 2012, accessed Jun. 9, 2012.*
C. Klumpner; A New Single-Stage Current Source Inverter for Photovoltaic and Fuel Cell Applications using Reverse Blocking IGBTs; Power Electronics Specialists Conference, 2007. PESC 2007. IEEE; Publication Date: Jun. 17-21, 2007; pp. 1683-1689; Location: Orlando, FL.
Won-Sik Oh; Sang-Kyoo Han; Seong-Wook Choi; Gun-Woo Moon; Three phase three-level PWM switched voltage source inverter with zero neutral point potential; Jun. 2004; pp. 4405-4410; vol. 6, Issue , 20-25.
Jain, S., Agarwal, V. ; A Single-Stage Grid Connected Inverter Topology for Solar PV Systems With Maximum Power Point Tracking; Power Electronics, IEEE Transactions on Publication Date: Sep. 2007; pp. 1928-1940; vol. 22, Issue: 5.

* cited by examiner

*Primary Examiner* — Michael Rutland Wallis
(74) *Attorney, Agent, or Firm* — Ann M. Agosti

(57) ABSTRACT

A power conversion system includes a photovoltaic source to generate direct current (DC) power; a direct current (DC) to an alternating current (AC) single stage inverter to convert the direct current (DC) power from the photovoltaic source to alternating current (AC) power for delivery to a power grid, and a load balancing unit coupled to the single stage inverter. The power conversion system also includes a controller configured to determine a maximum power point for the power conversion system, regulate an output voltage of the single stage inverter, compute a power balance difference between a power demand from the power grid and an output power of the single stage inverter obtainable at the maximum power point and control in real-time the load balancing unit based on the power balance difference.

17 Claims, 5 Drawing Sheets

SYSTEM AND METHOD FOR A SINGLE STAGE POWER CONVERSION SYSTEM

BACKGROUND

The invention relates generally to power conversion, and, more specifically, to a single stage power conversion system.

With the rising cost and scarcity of conventional energy sources and concerns about the environment, there is a significant interest in alternative energy sources such as solar power and wind power. Solar power generation uses photovoltaic sources to generate electricity from the sun. Multiple photovoltaic sources are electrically coupled to one another in such systems. The electricity generated by photovoltaic sources is transmitted to the power grid through one or more power electronic converters. The power electronic converters are commonly classified as dual stage converters and single stage converters depending on the number of stages employed to convert direct current power to alternating current power.

Conventional single stage power conversion systems include a single stage converter connected to a controller that implements a maximum power point (MPP) algorithm to transmit maximum alternating power to the power grid from the single stage converter. Typically, a single stage power conversion system is controlled such that its performance can be compared to a stiff current source. In such current-stiff embodiments, the controller ensures that a direct current voltage, hereinafter DC voltage, is held at a desired value by guaranteeing that the power injected in the power grid matches the power obtained from the photovoltaic source. This is achieved by regulating a grid alternating current, hereinafter AC current, such that it follows any variation of the input power obtained from the photovoltaic source. Current stiff power conversion systems do not set a grid voltage. In solar applications it is desired to constantly adjust the DC voltage to extract maximum power from the solar array.

Therefore, it is desirable to determine a method and system that will address the aforementioned issues.

BRIEF DESCRIPTION

In accordance with one embodiment of the invention, a power conversion system is provided. The power conversion system includes a photovoltaic source to generate direct current (DC) power; a direct current (DC) to an alternating current (AC) single stage inverter to convert the direct current (DC) power from the photovoltaic source to alternating current (AC) power for delivery to a power grid; a load balancing unit coupled to the single stage inverter; and a controller configured to determine a maximum power point for the power conversion system, regulate an output voltage of the single stage inverter, compute a power balance difference between a power demand from the power grid and an output power of the single stage inverter obtainable at the maximum power point and control in real-time the load balancing unit based on the power balance difference.

In accordance with another embodiment of the invention, a method is provided for controlling a power conversion system including a photovoltaic source to generate direct current (DC) power and a direct current (DC) to an alternating current (AC) single stage inverter to convert the direct current (DC) power from the photovoltaic source to alternating current (AC) power for delivery to a power grid. The method includes determining a maximum power point for the power conversion system, regulating an output voltage of the single stage inverter, computing a power balance difference between a power demand from the power grid and an output power of the single stage inverter obtainable at the maximum power point and controlling in real-time a load balancing unit based on the power balance difference.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As discussed in detail below, embodiments of the present invention include a system and method for a single stage power conversion system. The single stage power conversion system is designed to provide a substantially constant alternating current voltage, hereinafter AC voltage, to a power grid and to control the power balance between input power and output power. The voltage component of the AC power is controlled via a load balancing unit further connected to a controller. The controller determines a maximum power point, hereinafter MPP, for the power conversion system. The MPP is defined as the point at which a photovoltaic source provides maximum power as an output of the photovoltaic source. The controller further sets the voltage component of the AC power at an output of a single stage inverter during operation. Furthermore, the controller computes a power balance difference between a power demand from the power grid and the output power of the single stage inverter obtainable at the MPP. The controller controls the load balancing unit in real time based on the power balance difference. The load balancing unit provides an adequate load balancing power to the single stage inverter such that the solar conversion unit operates at MPP and ensures substantially constant AC voltage at varying grid conditions at the output of the single stage inverter.

The AC power is fed to a power grid which may comprise, for example, a utility grid, a mini-grid, a load, or combinations thereof. The AC power fed to the power grid in most conventional single stage power conversion systems is controlled via regulating a current component of the AC power. When regulating the current component of the AC power, it can be difficult to provide constant AC voltage to a power grid during changing load conditions and varying input power conditions.

Figure 1:
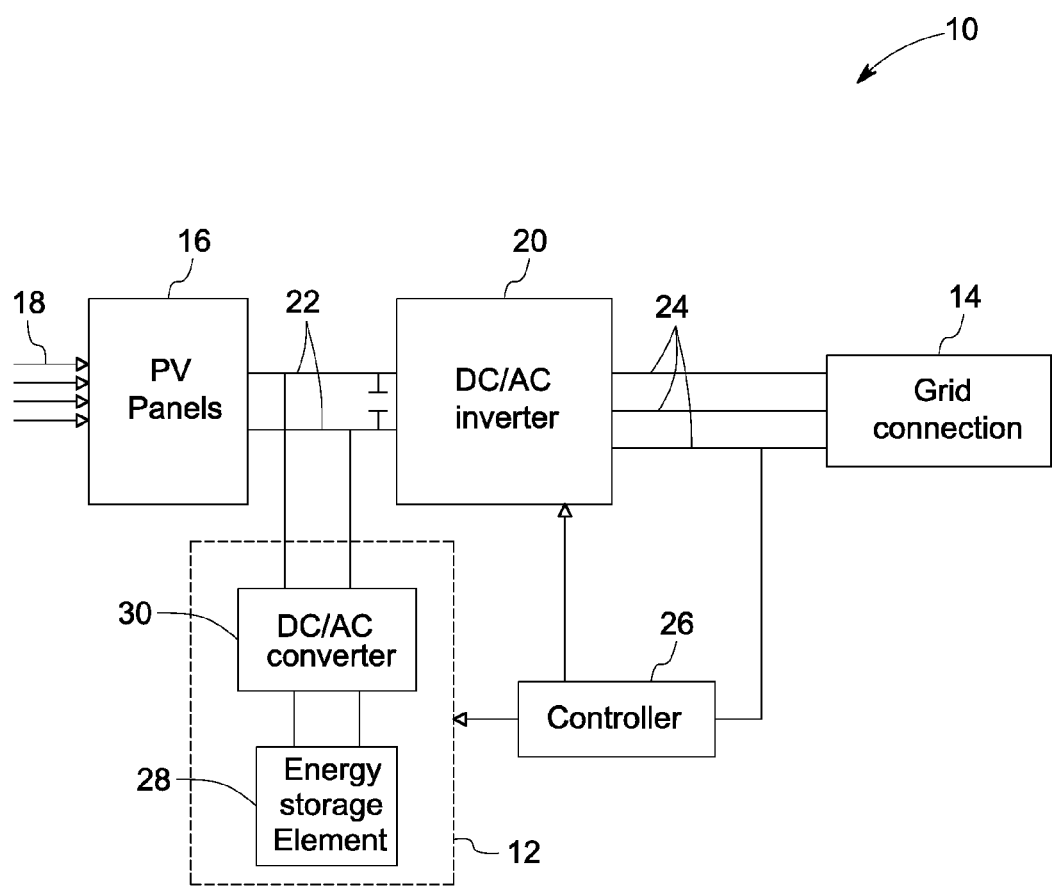
FIG. 1 is a block diagram representation an exemplary configuration of a single stage power conversion system including a load balancing unit that includes an energy storage element and a DC to DC converter to control the voltage component of the alternating current power fed to the power grid in accordance with an embodiment of the invention.

In contrast to current control embodiments, FIG. 1 is a block diagram representation of a single stage power conversion system 10 including a load balancing unit 12 to control the voltage component of the AC power fed to a power grid 14 in accordance with an embodiment of the invention. The power conversion system 10 includes a photovoltaic source 16, hereinafter PV source 16, to generate a direct current power, hereinafter DC power. In an exemplary embodiment, the PV source 16 may include one or more photovoltaic arrays or modules fabricated via interconnecting multiple solar cells. The PV source 16 captures solar energy 18 and converts the solar energy 18 to the DC power. The DC power includes a voltage component $V_{dc}$ at the PV source 16. The DC power is transmitted to a single stage inverter 20 via a DC link 22 as an input $DC_{in}$ to the single stage inverter 20. In one embodiment, the single stage inverter 20 comprises a three phase inverter. The single stage inverter 20 converts the input $DC_{in}$ to an alternating current power, hereinafter AC power, as an output $AC_{out}$. The $AC_{out}$ is supplied to a power grid 14 via a power line 24.

The $AC_{out}$ is regulated to maintain maximum yield of the power conversion system 10 by controlling the MPP of the power conversion system 10 while also providing a voltage component of the $AC_{out}$. The load balancing unit 12 is coupled to a controller 26 which controls the load balancing unit 12 and determines the MPP of the power conversion system 10. In an exemplary embodiment, the MPP is determined via a perturbation and observation method. The perturbation and observation method provides a method in which the voltage drawn from the solar array is perturbed and the power change is observed. If the perturbation results in an increase in power, the subsequent perturbation is made in the same direction and vice versa. Although controller 26 is shown as a discrete block for purposes of illustration, in some embodiments, the controller may include control functionality in multiple control units. In one particular example, at least a portion of controller 26 is located within DC to AC inverter 20.

The controller 26 regulates the voltage component $V_{ac}$ of the output $AC_{out}$. In one embodiment, a voltage sensor is coupled to the power line 24, and the controller 26 computes a difference $V_d$ between the voltage component $V_{ac}$ and a desired regulated grid voltage $V_r$. In a more specific embodiment, the controller 26 further compares the difference $V_d$ with a predefined voltage difference tolerance that represents an acceptable difference in voltage component $V_{ac}$ and the regulated grid voltage $V_r$. In an event of difference $V_d$ outside of the voltage difference tolerance, the controller 26 sends a control signal to the single stage inverter 20 drive the voltage component $V_{ac}$ towards the regulated grid voltage Vr.

The control signal to the single stage inverter is designed to drive the output voltage towards the regulated grid voltage; however, to provide voltage matching under conditions of power imbalance, the power imbalance also needs to be addressed. Thus, in addition to voltage regulation, the controller 26 is further used to compute a power balance difference (S) between the power demand from the power grid and the output power of the single stage inverter obtainable at the maximum power point. Controller 26 then controls the load balancing unit in real-time based on the power balance difference.

In one embodiment, the load balancing unit 12 includes an energy storage element 28. In an exemplary embodiment, the energy storage element 28 includes a battery or ultra-capacitor. In another embodiment, the load balancing unit 12 includes a resistor or a power dissipative element. When needed, in response to a control signal from the controller 26, the load balancing unit 12 will absorb or provide power while still allowing the controller 26 to enable the voltage $V_{ac}$ to be maintained at the desired reference level Vr or within the voltage difference tolerance while feeding the power grid 14 with a variable impedance characteristic and operating the power conversion system 10 at the MPP. In one embodiment, the load balancing unit will be controlled to absorb power when the power demanded from the power grid is less than the output power of the single stage inverter obtainable at the maximum power point by a first power difference tolerance and will be controlled to provide power when the power demanded from the power grid is greater than the output power of the single stage inverter obtainable at the maximum power point by a second power difference tolerance (which may have the same magnitude or a different magnitude as compared with the first power different tolerance). In a non limiting example, the load balancing unit 12 further includes a DC to DC converter 30 including switches that may be controlled for selectively providing or absorbing the AC power at the output of the single stage inverter 20.

Figure 2:
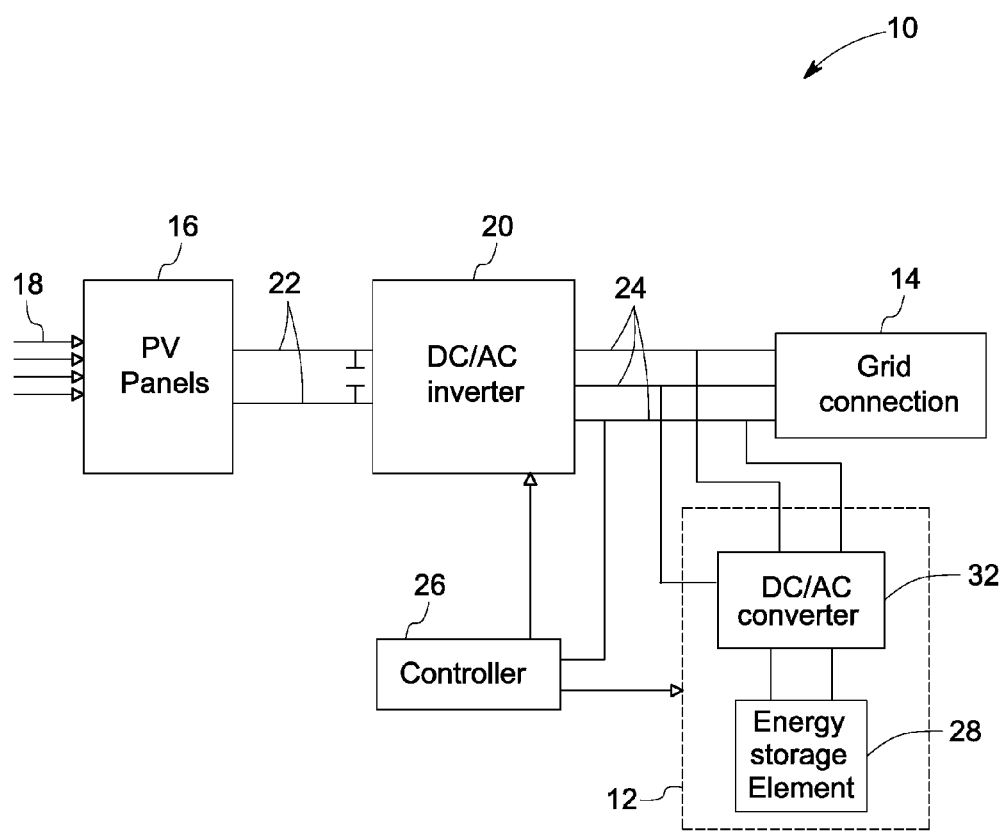
FIG. 2 is a diagrammatic representation of another exemplary configuration of the single stage power conversion system including a load balancing unit that includes an energy storage element coupled to a DC to AC converter to control the voltage component of the alternating current power fed to the power grid in accordance with an embodiment of the invention.

FIG. 2 is a diagrammatic representation of another exemplary configuration of the single stage power conversion system 10 including a load balancing unit 12 that includes an energy storage element 28 coupled to a DC to AC converter 32 to regulate the voltage and control the power fed to the power grid 14 in accordance with an embodiment of the invention. In this embodiment, the load balancing unit 12 is coupled to the power line 24 between the single stage converter 20 and power grid 14. As discussed above in FIG. 1, the controller 26 regulates the voltage component $V_{ac}$ to match the regulated grid voltage Vr, computes the power balance difference S between the power demand from the power grid and the output power of the single stage inverter obtainable at the maximum power point, and controls the load balancing unit in real-time based on the power balance difference S. In response to a control signal from the controller 26, the load balancing unit 12 will absorb or provide power allowing the controller 26 to enable the voltage $V_{ac}$ to be maintained at the desired reference level Vr or desired within the tolerance band $V_{th}$ while feeding the power grid 14 with a variable impedance characteristic and operating the power conversion system 10 at the MPP. In one embodiment, the load balancing unit 12 includes DC to AC converter 32.

Figure 3:
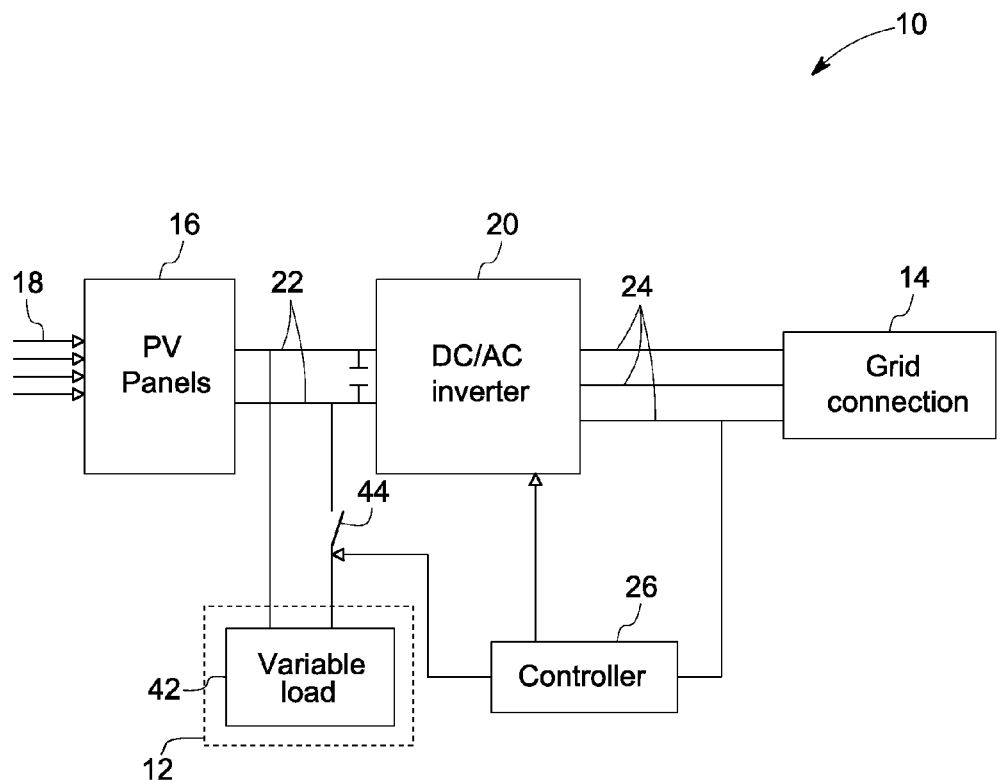
FIG. 3 is a diagrammatic representation of an exemplary configuration of the single stage power conversion system including a variable load coupled to a DC link between a photovoltaic source and a single stage inverter in accordance with an embodiment of the invention.

FIG. 3 is a diagrammatic representation of an exemplary configuration of a single stage power conversion system 10 including a load balancing unit 12 comprising a variable load 42 coupled to the DC link 22 between a PV source 16 and a single stage inverter 20 in accordance with an embodiment of the invention. In an exemplary embodiment, the variable load 42 includes a pump or a heater. The variable load 42 may be coupled to the DC link 22 via at least one switching device 44. As described above in FIG. 1, the controller 26 regulates the voltage component $V_{ac}$ to match the regulated grid voltage Vr, computes the power balance difference S between the power demand from the power grid and the output power of the single stage inverter obtainable at the maximum power point, and controls the load balancing unit in real-time based on the power balance difference. In one embodiment, in an event of the power balance difference S exceeding a power balance difference tolerance, the controller 26 sends a control signal to the at least one switching device 44 to switch to a closed state and provide an adequate load balancing power generated by the variable load 42 at the DC link 22. This will allow the controller 26 to enable the voltage $V_{ac}$ to be maintained at the desired reference level Vr or within the tolerance band $V_{th}$ while feeding the power grid 14 with a variable impedance characteristic and operating the power conversion system 10 at the MPP.

Figure 4:
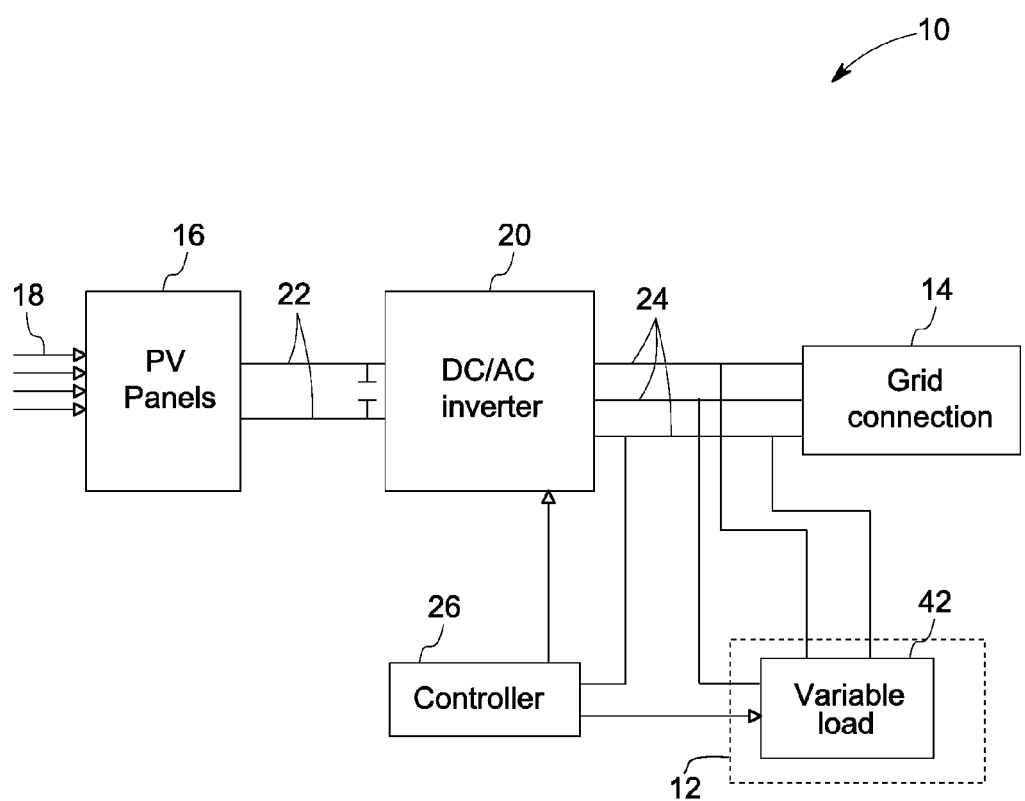
FIG. 4 is a diagrammatic representation of an exemplary configuration of the single stage power conversion system including a variable load coupled to a power line between the single stage inverter and the power grid in accordance with an embodiment of the invention.

FIG. 4 is a diagrammatic representation of another exemplary configuration of the single stage power conversion system 10 including a variable load 42 coupled to a power line 24 between the single stage inverter 20 and the power grid 14 in accordance with an embodiment of the invention. As described above in FIG. 2, the controller 26 regulates the voltage component $V_{ac}$ to match the regulated grid voltage Vr, computes the power balance difference S between the power demand from the power grid and the output power of the single stage inverter obtainable at the maximum power point, and controls the load balancing unit in real-time based on the power balance difference S. In one embodiment, in an event of the power balance difference S exceeding a power balance difference tolerance, the controller 26 sends a control signal to the variable load 42 to absorb or provide power allowing the controller 26 to enable the voltage $V_{ac}$ to be maintained at the desired reference level or within the tolerance band $V_{th}$ while feeding the power grid 14 with a variable impedance characteristic and operating the single stage power conversion system 10 at the MPP.

Figure 5:
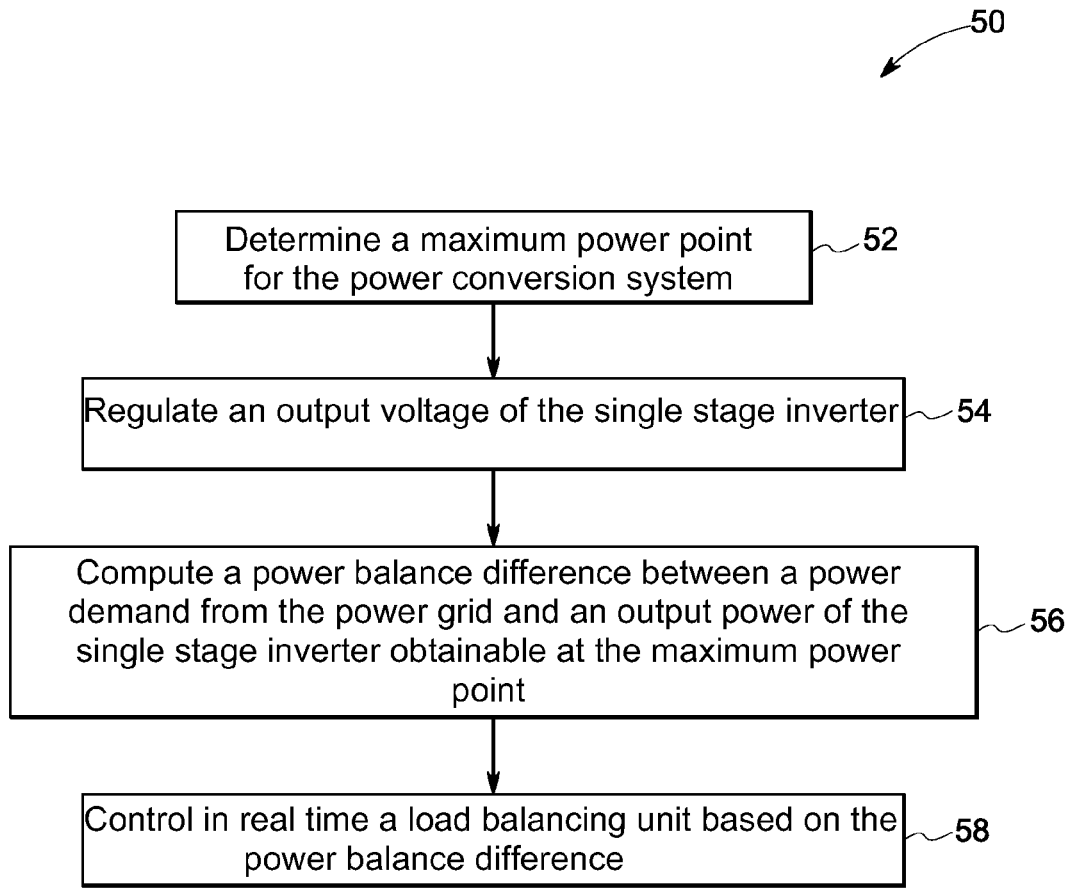
FIG. 5 is a flow chart representing the steps involved in a method for controlling a power conversion system in accordance with an embodiment of the invention.

FIG. 5 is a flow chart representing the steps involved in a method for controlling a power conversion system including a photovoltaic source to generate direct current (DC) power and a direct current (DC) to an alternating current (AC) single stage inverter to convert the direct current (DC) power from the photovoltaic source to alternating current (AC) power for delivery to a power grid in accordance with an embodiment of the invention. The method 50 includes determining a maximum power point (MPP) for the power conversion system in step 52. Furthermore, an output voltage of the single stage inverter is regulated in step 54. A power balance difference is computed between a power demand from the power grid and an output power of the single stage inverter obtainable at maximum power point in step 56. A load balancing unit is controlled in real time based on the power balance difference in step 58. In an embodiment of the invention, the load balancing unit is coupled to a DC link between the photovoltaic source and the single stage inverter in a parallel connection. In another embodiment of the invention, the load balancing unit may be coupled to a power line between the single stage inverter and the power grid. In exemplary embodiments of the invention, the load balancing unit includes an energy storage element or a variable load.

The various embodiments of a power conversion system described above provide a voltage controlled single stage power conversion system including a load balancing unit. The load balancing unit provides a load balancing voltage to a single stage inverter to ensure AC power at the MPP is fed to the power grid at a regulated voltage. Thus, these techniques enable a voltage source controlled power conversion system that is particular useful for weak grid and islanded conditions. Furthermore, existing single stage power conversion systems can be upgraded to operate in weak grid environments by adding load balancing units and modifying control systems as described herein.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the DC to AC converter with respect to one embodiment can be adapted for use with the variable load described with respect to another embodiment of the invention to generate power at maximum power point in the voltage source controlled single stage power conversion system. Similarly, the various features described, as well as other known equivalents for each feature, may be mixed and matched by one of ordinary skill in this art to construct additional systems and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power conversion system comprising:
   a photovoltaic source to generate direct current (DC) power;
   a direct current (DC) to an alternating current (AC) single stage inverter to convert the direct current (DC) power from the photovoltaic source to alternating current (AC) power for delivery to a power grid;
   a voltage sensor to obtain a voltage component of the alternating current power;
   a load balancing unit coupled to the single stage inverter; and
   a controller configured to:
      determine a maximum power point for the power conversion system;
      compute a difference between the voltage component of the alternating current power and a desired regulated grid voltage;
      use the difference between the voltage component of the alternating current power and the desired regulated grid voltage to generate a control signal for the single stage inverter to drive the voltage component of the alternating current power towards the regulated grid voltage;
      compute a power balance difference between a power demand from the power grid and an output power of the single stage inverter obtainable at the maximum power point; and
      control in real-time the load balancing unit based on the power balance difference.

2. The system of claim 1, wherein the load balancing unit comprises an energy storage element.

3. The system of claim 2, wherein the energy storage element comprises a battery or an ultra-capacitor.

4. The system of claim 1, wherein the load balancing unit comprises a resistor or a power dissipative element.

5. The system of claim 2, wherein the load balancing unit further comprises a DC to DC converter and the energy storage element is coupled via the DC to DC converter to a DC link between the photovoltaic source and the single stage inverter.

6. The system of claim 2 wherein the load balancing unit further comprises a DC to AC converter and the energy storage element is coupled via the DC to AC converter to a power line between the single stage inverter and the power grid.

7. The system of claim 1, wherein the load balancing unit comprises a variable load.

8. The system of claim 7 wherein the variable load comprises a pump or a heater.

9. The system of claim 7 wherein the variable load is coupled to the DC link between the photovoltaic source and the single stage inverter or to a power line between the single stage inverter and the power grid.

10. The system of claim 1, wherein the load balancing unit comprises at least one switching device and the controller is configured to send control signals to the at least one switching device.

11. The system of claim 1, wherein the single stage inverter comprises a three phase inverter.

12. A method of controlling a power conversion system comprising a photovoltaic source to generate direct current (DC) power and a direct current (DC) to an alternating current (AC) single stage inverter to convert the direct current (DC) power from the photovoltaic source to alternating current (AC) power for delivery to a power grid, the method comprising:
   determining a maximum power point for the power conversion system;
   sensing a voltage component of the alternating current power;
   computing a difference between the voltage component of the alternating current power and a desired regulated grid voltage;
   using the difference between the voltage component of the alternating current power and the desired regulated grid voltage to generate a control signal for the single stage inverter to drive the voltage component of the alternating current power towards the regulated grid voltage;
   computing a power balance difference between a power demand from the power grid and an output power of the single stage inverter obtainable at the maximum power point; and
   controlling in real time a load balancing unit based on the power balance difference.

13. The method of claim 12, wherein coupling the load balancing unit comprises coupling the load balancing unit to a DC link between the photovoltaic source and the single stage inverter.

14. The method of claim 12, wherein coupling the load balancing unit comprises coupling the load balancing unit to a power line between the single stage inverter and the power grid.

15. The method of claim 12, wherein the load balancing unit comprises an energy storage element or a variable load.

16. The system of claim 1, wherein the controller is further configured to use the difference between the voltage component of the alternating current power and the desired regulated grid voltage to generate the control signal by comparing the difference with a predefined voltage difference tolerance and sending a control signal to the single stage inverter to drive the voltage component of the alternating current power towards the regulated grid voltage in event of the difference being more than the predefined voltage difference tolerance.

17. The method of claim 12, wherein using the difference between the voltage component of the alternating current power and the desired regulated grid voltage to generate the control signal comprises comparing the difference with a predefined voltage difference tolerance and sending a control signal to the single stage inverter to drive the voltage component of the alternating current power towards the regulated grid voltage in event of the difference being more than the predefined voltage difference tolerance.

* * * * *